US005335409A

United States Patent [19]

Elvebak

[11] Patent Number: 5,335,409

[45] Date of Patent: Aug. 9, 1994

[54] SCREWDRIVER INCLUDING A HANDLE WITH AN O-RING THEREIN FOR RETAINING A REMOVABLE BIT AND METHOD OF ASSEMBLY THEREFOR

[75] Inventor: Dale D. Elvebak, Albert Lea, Minn.

[73] Assignee: Enderes Tool Co., Inc., Apple Valley, Minn.

[21] Appl. No.: 79,644

[22] Filed: Jun. 18, 1993

[51] Int. Cl.$^5$ ........................ B23P 11/02; B25B 23/00

[52] U.S. Cl. ........................ 29/451; 29/521; 29/525; 81/438

[58] Field of Search ........................ 81/437, 438, 439; 29/451, 432, 525, 521

[56] References Cited

U.S. PATENT DOCUMENTS

| | | | |
|---|---|---|---|
| 772,593 | 10/1904 | Wagner | 81/438 |
| 2,158,728 | 5/1939 | Peters | 81/439 |
| 3,455,355 | 7/1969 | McLogan et al | 81/438 |
| 4,096,896 | 6/1978 | Engel | 81/438 |
| 4,404,874 | 9/1983 | Lieser | 81/438 |
| 4,535,658 | 8/1985 | Molinari | 81/438 |

OTHER PUBLICATIONS

Enderes Tool Company catalog, 16 pages, dated Jul. 1, 1986.

Enderes Tool Company catalog, front cover, pp. 1–4, and back cover, dated Jun. 1, 1993.

Enderes Tool Company sell sheet, 2 pages, dated Nov., 1985.

Handyway Tools catalog, cover page, pp. 2–3, and back cover, dated 1986.

Vermont American catalog, 2 cover pages, pp. 90–109, and back cover, dated Apr., 1992.

Vermont American sell sheet, 2 pages, dated 1992.

Two photographs of a Channel Lock 4′ n 1 TM combination screwdriver, designation "MX-41".

*Primary Examiner*—Mark Rosenbaum
*Assistant Examiner*—David P. Bryant
*Attorney, Agent, or Firm*—Merchant, Gould, Smith, Edell, Welter & Schmidt

[57] ABSTRACT

A screwdriver is provided with a handle including an insert and an O-ring wherein the O-ring is positioned between the insert and a shoulder in the opening into the handle. A bit is held in the handle by the O-ring. A method of assembly is provided wherein an O-ring and an insert member are positioned around a shaft of a bit and then the bit is inserted into a handle, followed by the O-ring and the insert. The bit is removed from the handle leaving the O-ring positioned between the insert and a shoulder of the handle, for subsequent receipt of the same end of the bit, another end of the bit, or a different bit.

18 Claims, 2 Drawing Sheets

SCREWDRIVER INCLUDING A HANDLE WITH AN O-RING THEREIN FOR RETAINING A REMOVABLE BIT AND METHOD OF ASSEMBLY THEREFOR

FIELD OF THE INVENTION

The present invention relates to tools generally, and specifically to screwdrivers.

BACKGROUND OF THE INVENTION

Tools, including screwdrivers, are known which include a handle, a workpiece engaging tip or bit, and structure for mounting the bit to the handle. Some tools are known, including screwdrivers, where the mounting of the bit to the handle is temporary to permit the bit to be separated from the handle, such as to utilize a second bit with the handle. An example of a temporary mounting structure includes a ball and spring arrangement mounted to the handle where the ball engages the bit to hold the bit once the bit is inserted into the handle.

There is a need for tools, including screwdrivers, and methods for assembly of such tools, where the tools are provided with a handle and one or more releasably mounted bits wherein the tools are reliable, easy to use, and/or easy and cost effective to manufacture. In particular, there is a need for pocket type screwdrivers with both a flat point and a "PHILLIPS" point, that are reliable, easy to use, and easy and cost effective to manufacture.

SUMMARY OF THE INVENTION

The present invention relates to a tool including a handle defining an opening into the handle for receipt of a bit. The opening includes a shoulder for positioning an O-ring between the shoulder and an insert mounted to the handle within the opening. A bit is received by the opening of the handle and an opening through the insert such that the O-ring resiliently grips the exterior surface of the shaft of the bit to hold the bit in the handle with sufficient force to permit the bit to be held in the handle during use by grasping of the handle by the user.

The gripping force of the O-ring on the shaft of the bit can be readily overcome by a sufficient force applied by the user to the handle and to the bit to separate the bit from the handle. The O-ring remains within the handle positioned between the insert and the handle, with its axis generally concentric with the axis of the insert and axis of the handle. The bit can be interchanged with another bit. Alternatively, the bit will include two work piece engaging ends that can be alternately utilized when the other end is inserted into the handle. In the preferred embodiment, the tool is a screwdriver and the bit includes a flat point at one end and a "PHILLIPS" point at the opposite end.

The tool includes means for preventing relative rotation of the bit about a longitudinal axis relative to the handle. Preferably, the bit includes a shaft having at least one planar surface, preferably hexagonally shaped in cross-section, and the insert is provided with an opening with a mating planar surface, preferably a hexagonally-shaped opening in cross-section, for engagement with the shaft.

The insert preferably includes a lead in region smaller than the diameter of the opening into the handle for use in guiding the insert into the handle during assembly. The insert also preferably includes an enlarged region, preferably knurled, having an outer diameter larger than the diameter of the opening into the handle prior to assembly wherein the enlarged region grips the handle at the opening to mount the insert to the handle.

The present invention also relates to a method of assembling a tool, such as a screwdriver, wherein a bit is provided with a first end, a second end, and a shaft extending between the first end and the second end. The method comprises the steps of positioning a resilient O-ring and an insert around the shaft, inserting the first end of the bit into the handle along with the O-ring positioned around the shaft followed by the insert positioned around the shaft. The O-ring has an inner diameter smaller than a maximum diameter of the shaft. The insert is pushed into the opening to push the O-ring into the proper position in the opening, between the insert and a shoulder provided in an interior of the handle, wherein the O-ring resiliently grips the shaft of the bit. The method further comprises removing the bit leaving the O-ring positioned between the insert and the shoulder. The method further comprises reinserting the bit into the opening of the handle wherein the O-ring resiliently grips the shaft of the bit. The method also preferably includes inserting the second end of the bit into the handle after the bit has been removed.

DETAILED DESCRIPTION OF THE PREFERRED EMBODIMENT

Figure 1:
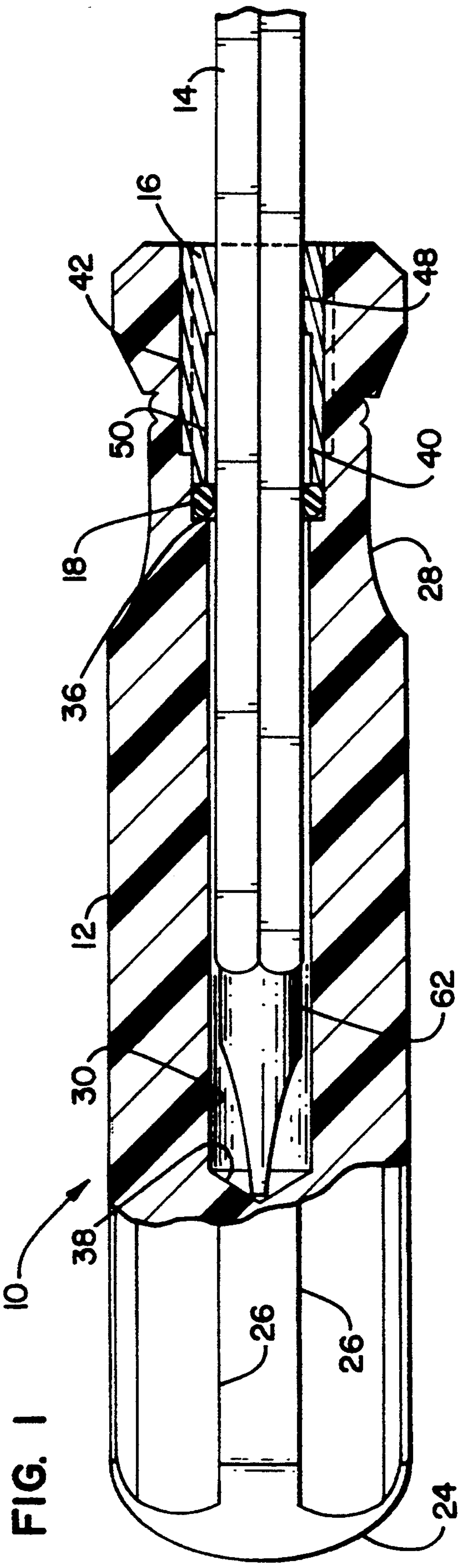
FIG. 1 is an enlarged assembled view it, partial cross-section of a screwdriver according to the present invention, with the end of the bit extending from the handle not shown.
Figure 3:
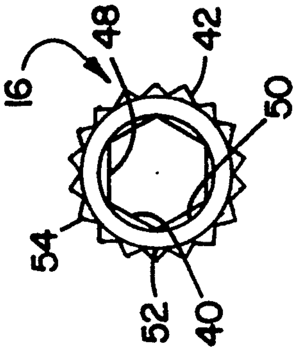
FIG. 3 shows an enlarged end view of the insert.
Figure 2:
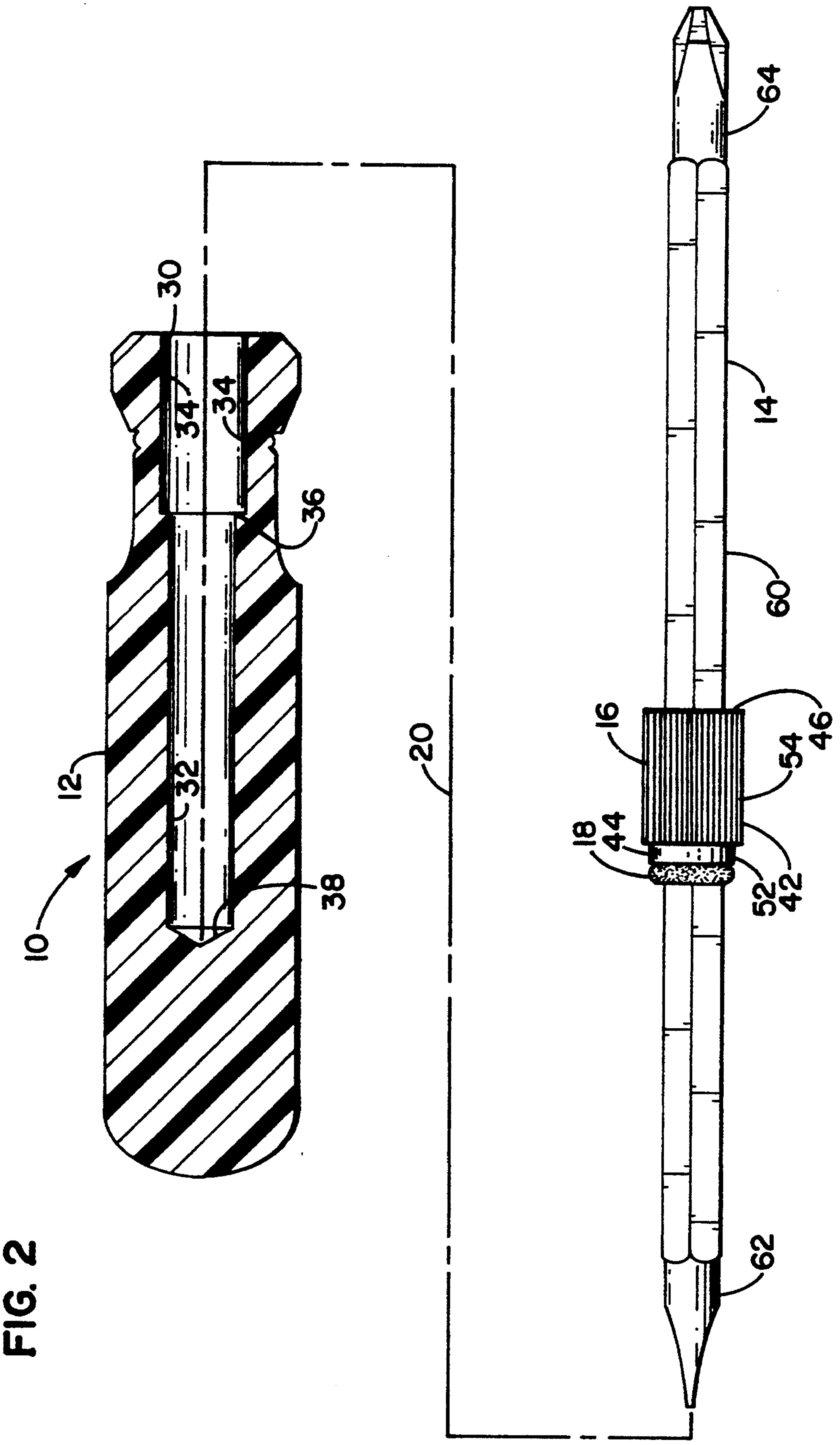
FIG. 2 shows the screwdriver of FIG. 1 during assembly.

Referring now to FIGS. 1–3, a tool, or screwdriver 10 is shown including a handle 12, and a removably attached bit 14. An insert 16 is mounted to handle 12 to position a resilient O-ring 18 for gripping bit 14 to hold bit 14 in handle 12 during use. O-ring 18 has an inner diameter smaller than a maximum diameter of bit 14 which is insertable into handle 12. The resilient gripping force supplied by O-ring 18 can be overcome by an axial force applied in the direction of axis 20 to thereby separate bit 14 from handle 12, insert 16 and O-ring 18, leaving O-ring 18 positioned in handle 12 with its axis generally concentric with the axis of insert 16 and the axis of handle 12.

Handle 12 generally includes an outer surface 24 provided with longitudinal slots 26 and a necked portion 28 for convenient grasping by the hand of the user. Handle 12 further includes an inner surface 30 defining an opening into handle 12. Inner surface 30 comprises a small passage 32, preferably cylindrical in shape, and a large passage 34, preferably cylindrical in shape, and having a diameter greater than small passage 32. Between large passage 34 and small passage 32 is a shoulder 36 generally perpendicular to longitudinal axis 20.

Insert 16 includes an inner surface 40 and an outer surface 42 extending between a first end 44 and a second end 46. Inner surface 40 includes a first portion 48 having a hexagonally-shaped opening in cross-section for mating with a reciprocally-shaped portion on bit 14. Inner surface 40 further includes a second portion 50 generally defining a cylinder. Outer surface 42 includes a lead in portion 52 adjacent first end 44 having an outer diameter smaller than the diameter defined by large passage 34 of handle 12. Outer surface 42 further includes an enlarged portion 54 preferably knurled which includes a plurality of longitudinally extending ribs defining a maximum outer diameter for outer surface 42 being greater than the diameter defined by large passage 34 of handle 12.

As shown in FIG. 1, a first end 44 of insert 16 and shoulder 36 define a chamber for receipt and maintenance of O-ring 18. In this manner, O-ring 18 is conveniently held within handle 12. During use when bit 14 is separate from handle 12, bit 14 is inserted into handle 12 past O-ring 18 wherein O-ring 18 exerts a resilient gripping force on an exterior surface of bit 14.

Bit 14 includes a shaft 60 extending between first end 62 and second end 64. First end 62 can butt up against end 38 of opening 30 during use. As shown in the preferred embodiment, first end 62 is shaped as a flat point screwdriver tip. Second end 64 is shaped as a "PHILLIPS" point screwdriver tip.

Shaft 60 includes a hexagonally-shaped central portion in cross-section for engagement with hexagonally-shaped portion 48 of insert 16. The hexagonally-shaped surfaces cooperate to limit relative rotation between handle 12/insert 16 and bit 14 when torques are applied through handle 12 to bit 14 to a workpiece during use. Other structures for limiting relative rotation between handle 12 and bit 14 are anticipated, including shaft 60 of bit 14 defining other shapes comprising at least one generally planar surface portion, such as in the case of a square shape with four planar surfaces, for cooperating with a reciprocally-shaped opening in insert 16.

For the assembled screwdriver 10 shown in FIG. 1, if a different bit 14 is desired, or use of first end 62 of bit 14 is desired, then the user applies a force along longitudinal axis 20 to separate bit 14 from handle 12. O-ring 18 exerts a force on bit 14 wherein the user can fairly easily overcome the gripping force to remove bit 14 from handle 12 by hand, and yet the force is great enough to overcome gravity to prevent bit 14 from falling out of handle 12 when handle 12 is held such that the opening faces at least partially downwardly toward the ground. Once bit 14 is removed by the application of the axial force sufficient to overcome the resilient gripping force applied by O-ring 18 on shaft 60, O-ring 18 remains properly positioned inside handle 12 ready to receive another bit or the second end 64 of bit 14. If desired, first end 62 of bit 14 can be reinserted into handle 12. A pull out force of about five pounds more or less so permits bit 14 to be readily removed from handle 12 by hand.

If use of first end 62 of bit 14 is desired, then second end 64 is inserted into opening 30 through insert 16 such that second end 64 passes beyond O-ring 18 such that O-ring 18 exerts a resilient gripping force on shaft 60.

Referring now to FIG. 2, a method of assembly of screwdriver 10 is illustrated. Shaft 60 of bit 14 is first provided with insert 16 and O-ring 18 positioned around shaft 60 as shown in FIG. 2. It is anticipated that insert 16 and O-ring 18 can be positioned on shaft 60 in any order, or simultaneously. Once bit 14 is provided with insert 16 and O-ring 18 as shown in FIG. 2, then first end 62 of bit 14 is inserted into the opening defined by handle 12. Continued insertion of bit 14 is provided, and possibly a sliding of O-ring 18 and insert 16 toward end 38 of handle 12 on shaft 60 wherein O-ring 18 and insert 16 become positioned within the opening of handle 12. Lead in 52 of insert 16 is useful in properly aligning insert 16 during assembly since lead in 52 fits within large passage 34. A hydraulic press is useful for inserting insert 16 into handle 12 to securely mount knurled portion 54 to large passage 34. An interference fit maintains insert 16 in opening 30 with some deformation of handle 12. The application of force to slide insert 16 along shaft 60 into opening 30 pushes O-ring 18 into the appropriate position in opening 30, adjacent shoulder 36. In this position, O-ring 18 is permanently trapped in the chamber between shoulder 36 and insert 16. Insert 16 is preferably pushed into handle 12 until end 46 of insert 16 is flush with the end of handle 12 as shown in FIG. 1.

Handle 12 can be made from a variety of plastics such as conventional acetates of the type used for making screwdriver handles in the past. Insert 16 and bit 14 may be made from a variety of materials including metals such as high carbon steel, e.g. 1078 steel, for bit 14 and low carbon steel, e.g. 1218 steel, for insert 16. O-ring 20 can be made from a plurality of resilient materials, including rubber.

A preferred embodiment of tool 10 is the screwdriver shown in the drawings and described above. It is to be appreciated that tool 10 could be a variety of other handheld tools, with bit 14 being provided with one or more different workpiece engaging tips, instead of one or both of the flat point and "PHILLIPS" point shown in the drawings. It is also to be appreciated that a plurality of different bits 14 could be provided in a tool kit, where each bit includes one or two differently shaped workpiece engaging tips.

The following is provided as an example of one embodiment of screwdriver 10 according to the present invention. Handle 12 is provided with a length of approximately 2¼ inches, with small passage 32 at about 7/32 inches diameter to a depth of about 2 inches plus or minus 0.020 inches from the open end of handle 12, and large passage 34 having a diameter of about 0.325 inches plus or minus 0.002 inches to a depth of about 0.600 inches plus or minus 0.020 inches from the open end of handle 12. Insert 16 includes knurled portion 54 which extends for about 0.440 inches plus or minus 0.020 inches with straight knurl 20 TPI. Knurled portion 54 is at about 0.317 inches plus or minus 0.002 inches before knurling and about 0.337 inches plus or minus 0.002 inches after knurling. Lead in portion 52 includes an outer diameter of about 0.305 inches plus or minus 0.002 inches. Insert 16 generally extends for a total length of about 0.500 inches plus or minus 0.010 inches. Hex portion 48 extends for about 0.250 inches plus or minus 0.010 inches and is dimensioned at about 0.191 inches in diameter plus 0.004 inches or minus 0.001 inches before formation of the hex, and then broached to about 0.190 inches hex plus 0.005 inches or minus 0.002 inches. Cylindrical portion 50 is at about 0.219 inches plus 0.003 inches or minus 0.002 inches and can be drilled with a 7/32 drill bit. Bit 14 can be at any length desired by the user. A shaft length of about 4.550 inches in combination with handle 12 dimensioned as above works well for a pocket screwdriver. Shaft 60 works well with the above insert if it is provided with about a 3/16 inch hex shape (3/16 inches is a measurement of the minimum diameter). O-ring 18 is a conventional rubber O-ring having about a 3/16 inches inside diameter and about a 5/16 inches outside diameter. A force of about 200 pounds is needed to position insert 16 into handle 12 in this example.

It must be understood, however, that even though numerous advantages and characteristics of the invention have been set forth in the foregoing description, together with details of the structure and function of the invention, the disclosure is illustrative only, and changes may be made in detail, especially in matters of shape, size and material components within the principals of the invention, to the full extent indicated by the broad, general meanings of the terms in which the appended claims are expressed.

What is claimed is:

1. A tool comprising:

a handle defining an opening into the handle and a shoulder disposed within the opening, the opening defining a longitudinal axis, the shoulder including a surface extending generally transverse to the longitudinal axis;

a bit including a first end, a second end, and a shaft extending between the first end and the second end, the first end of the bit extending into the opening of the handle past the shoulder;

an insert mounted to the handle in the opening, the insert defining a passage through the insert for receiving the bit, and an end of the insert positioned in the opening of the handle, the end including a surface extending generally transverse to the longitudinal axis, wherein the surface of the end is spaced apart from the surface of the shoulder defining a chamber;

a resilient O-ring with an inside dimension smaller than an outer diameter of a portion of the first end of the bit which extends into the opening, the O-ring positioned around the shaft of the bit and also in the chamber between the surface of the end of the insert and the surface of the shoulder of the handle within the opening of the handle, the O-ring engaged with the portion of the first end of the shaft the O-ring engageable with the surface of the end and the surface of the shoulder to remain in the chamber during use; and means for preventing rotation of the bit about the longitudinal axis relative to the insert.

2. The tool of claim 1, wherein the means for preventing rotation includes a hex-shaped portion on the shaft of the bit and a hex-shaped portion along the passage of the insert.

3. The tool of claim 1, wherein the first end of the bit defines a flat point screwdriver tip and wherein the second end of the bit defines a PHILLIPS point screwdriver tip.

4. The tool of claim 1, wherein the insert includes a lead in portion adjacent the end thereof and having an outer diameter smaller than the diameter defined by the opening into the handle, and an enlarged portion disposed away from the end thereof and having an outer diameter greater than the diameter defined by the opening into the handle.

5. The tool of claim 1, wherein the opening is defined by a small inner diameter portion having a generally cylindrical cross-section, and a large inner diameter portion having a generally cylindrical cross-section with a diameter greater than the small inner diameter portion, the shoulder being disposed between the small inner diameter portion and the large inner diameter portion.

6. A tool handle comprising:

a body having an inner surface defining an opening into the body at one end of the body, the opening defining a longitudinal axis, the inner surface of the body including:

a small inner diameter portion disposed away from the end of the body;

a large inner diameter portion disposed adjacent the end of the body, the large inner diameter portion being greater in diameter than the small inner diameter portion; and a shoulder positioned between the small inner diameter portion and the large inner diameter portion, the shoulder including a surface extending generally transverse to the longitudinal axis;

an insert mounted to the body, the insert including:

a lead in portion positioned in the opening of the body and having an outer diameter smaller than the large inner diameter portion of the body;

an enlarged portion positioned in the opening of the body and defining an outer diameter greater than the large inner diameter portion of the body for engaging the inner surface at the large inner diameter portion;

an inner passage including at least one planar surface and being sized to receive a bit; and an end adjacent the lead in portion and positioned in the opening of the body at a spaced apart distance from the shoulder, the end including a surface extending generally transverse to the longitudinal axis; and a resilient O-ring held within the body and positioned between the surface of the end of the insert and the surface of the shoulder wherein the shoulder prevents insertion of the O-ring to the small inner diameter portion of the body and the end of the insert prevents removal of the O-ring from the large inner diameter portion.

7. The tool handle of claim 6, further comprising a bit including a shaft having at least one planar surface for cooperation with the at least one planar surface of the inner passage of the insert, the O-ring positioned to exert a resilient gripping force on the shaft of the bit.

8. The tool handle of claim 7, wherein the bit includes a first end having a flat point screwdriver tip, and a second end including a PHILLIPS point screwdriver tip.

9. The tool handle of claim 8, wherein the small inner diameter portion includes a generally cylindrical portion, and wherein the large inner diameter portion includes a generally cylindrical portion.

10. A method of assembling a tool comprising the steps of:

providing a bit with a shaft extending between a first end and a second end;

positioning an O-ring around the shaft;

positioning an insert around the shaft;

inserting the first end of the bit into an opening in a handle;

inserting the O-ring positioned around the shaft of the bit into the opening in the handle by pushing the insert positioned around the shaft of the bit into the opening of the handle wherein an outer surface of the insert engages an inner surface of the handle which defines the opening to mount the insert to the handle.

11. The method of claim 10, further comprising the step of removing the bit from the handle, the O-ring, and the insert, leaving the O-ring positioned between the insert and the handle.

12. The method of claim 11, further comprising the step of reinserting the first end of the bit into the insert, the O-ring, and the handle.

13. The method of claim 11, further comprising the step of inserting the second end of the bit into the insert, the O-ring, and the handle.

14. A tool comprising:

a handle defining an opening into the handle and a shoulder disposed within the opening, the opening defining a longitudinal axis;

a bit including a first end, a second end, and a shaft extending between the first end and the second end, the first end of the bit extending into the opening of the handle past the shoulder;

an insert mounted to the handle in the opening, the insert defining a passage through the insert for receiving the bit, and an end of the insert positioned in the opening of the handle wherein the end is spaced apart from the shoulder to define a chamber;

a resilient O-ring positioned around the shaft of the bit and also in the chamber between the end of the insert and the shoulder of the handle within the opening of the handle, the O-ring exerting a resilient gripping force on the shaft to retain the first end of the bit within the opening of the handle;

the shaft and the insert each including an interlocking surface portion engaged with each other such that relative rotation of the shaft and the insert about the longitudinal axis is prevented;

wherein the bit is insertable and removable from the handle;

wherein the O-ring is engaged with the shoulder of the handle during insertion of the bit; and wherein the O-ring is engaged with the end of the insert during removal of the bit from the handle.

15. The tool of claim 14, wherein the interlocking surface portion of the shaft includes a planar surface, and wherein the interlocking surface portion of the insert includes a planar surface engaged with the planar surface of the shaft.

16. The tool of claim 15, wherein the first end of the bit defines a flat point screwdriver tip and wherein the second end of the bit defines a PHILLIPS point screwdriver tip.

17. The tool of claim 14, wherein the insert includes a lead in portion adjacent the end thereof and having an outer diameter smaller than the diameter defined by the opening into the handle, and an enlarged portion disposed away from the end thereof and having an outer diameter greater than the diameter defined by the opening into the handle.

18. The tool of claim 14, wherein the opening is defined by a small inner diameter portion having a generally cylindrical cross-section, and a large inner diameter portion having a generally cylindrical cross-section with a diameter greater than the small inner diameter portion, the shoulder being disposed between the small inner diameter portion and the large inner diameter portion.

* * * * *